United States Patent [19]

McGee

[11] Patent Number: 4,534,009

[45] Date of Patent: Aug. 6, 1985

[54] PIPELINED FFT PROCESSOR

[75] Inventor: Kevin J. McGee, Newport, R.I.

[73] Assignee: The United States of America as represented by the Secretary of the Navy, Washington, D.C.

[21] Appl. No.: 376,468

[22] Filed: May 10, 1982

[51] Int. Cl.³ .............................................. G06F 15/34
[52] U.S. Cl. ..................................... 364/726; 364/900
[58] Field of Search ......................................... 364/726

[56] References Cited

U.S. PATENT DOCUMENTS

| | | | |
|---|---|---|---|
| 3,544,775 | 12/1970 | Bergland et al. | 364/726 |
| 3,702,393 | 11/1972 | Fuss | 364/726 |
| 3,816,729 | 6/1974 | Works | 364/726 |
| 3,881,100 | 4/1975 | Works et al. | 364/726 |
| 3,892,956 | 7/1975 | Fuss | 364/726 |

Primary Examiner—Gareth D. Shaw
Assistant Examiner—Melinda Thaler
Attorney, Agent, or Firm—Robert F. Beers; Arthur A. McGill; Prithvi C. Lall

[57] ABSTRACT

A pipelined Fast Fourier Transform (FFT) processor is described for processing continuous sets of N samples in a highly efficient manner. Within a single set of N inputs, the samples arrive in pairs (sample 0, and 1, 2 and 3, 4 and 5, etc.). This input sequence can be obtained from a sequential stream of inputs (sample 0 followed by smples 1, 2, 3, 4, etc.) by delaying the even numbered sample by one time unit. Alternately, the device could be made to operate on sequential samples within a set of N samples by internal pipelining of the arithmetic units. The device achieves high arithmetic unit efficiency while minimizing the memory required by allowing each arithmetic unit in the pipeline, with the exception of the last, to operate on the even or odd numbered samples first, after which it will operate on the remaining samples, which have been appropriately delayed and switched through shift registers and switches. The structure of the device, through its novel arrangement of shift registers and switches, allows an internal reordering of the data such that 100 percent arithmetic unit efficiency can be obtained, while requiring only $2(N-1)-(N/2)$ memory locations.

9 Claims, 21 Drawing Figures

ONE SET OF OUTPUTS FOR EACH SET OF INPUTS

THE BUTTERFLY

PERFORMS THE CALCULATION
$U' = U + LW^P$ AND $L' = U - LW^P$
WHERE $W^P$ IS THE ROTATION VECTOR

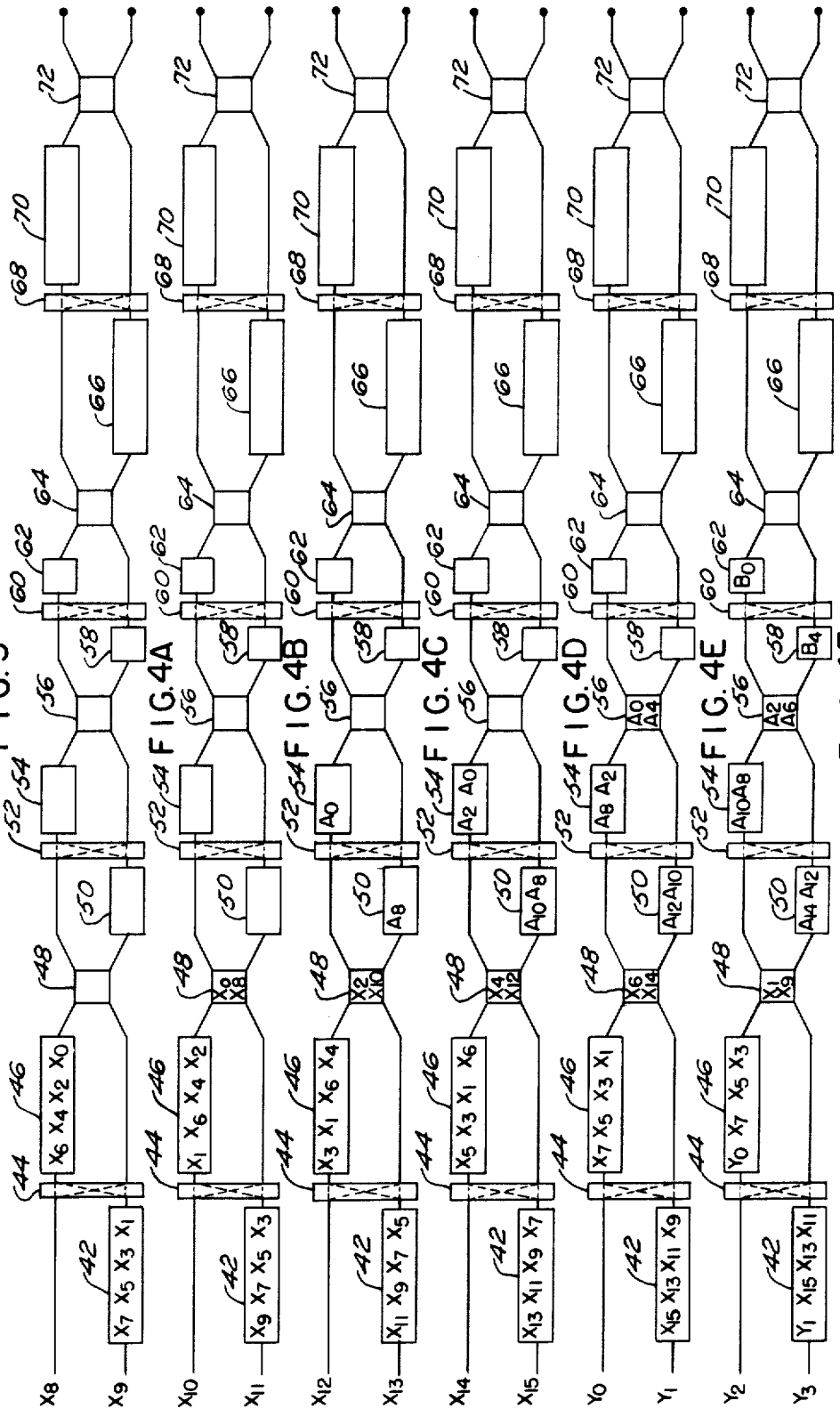

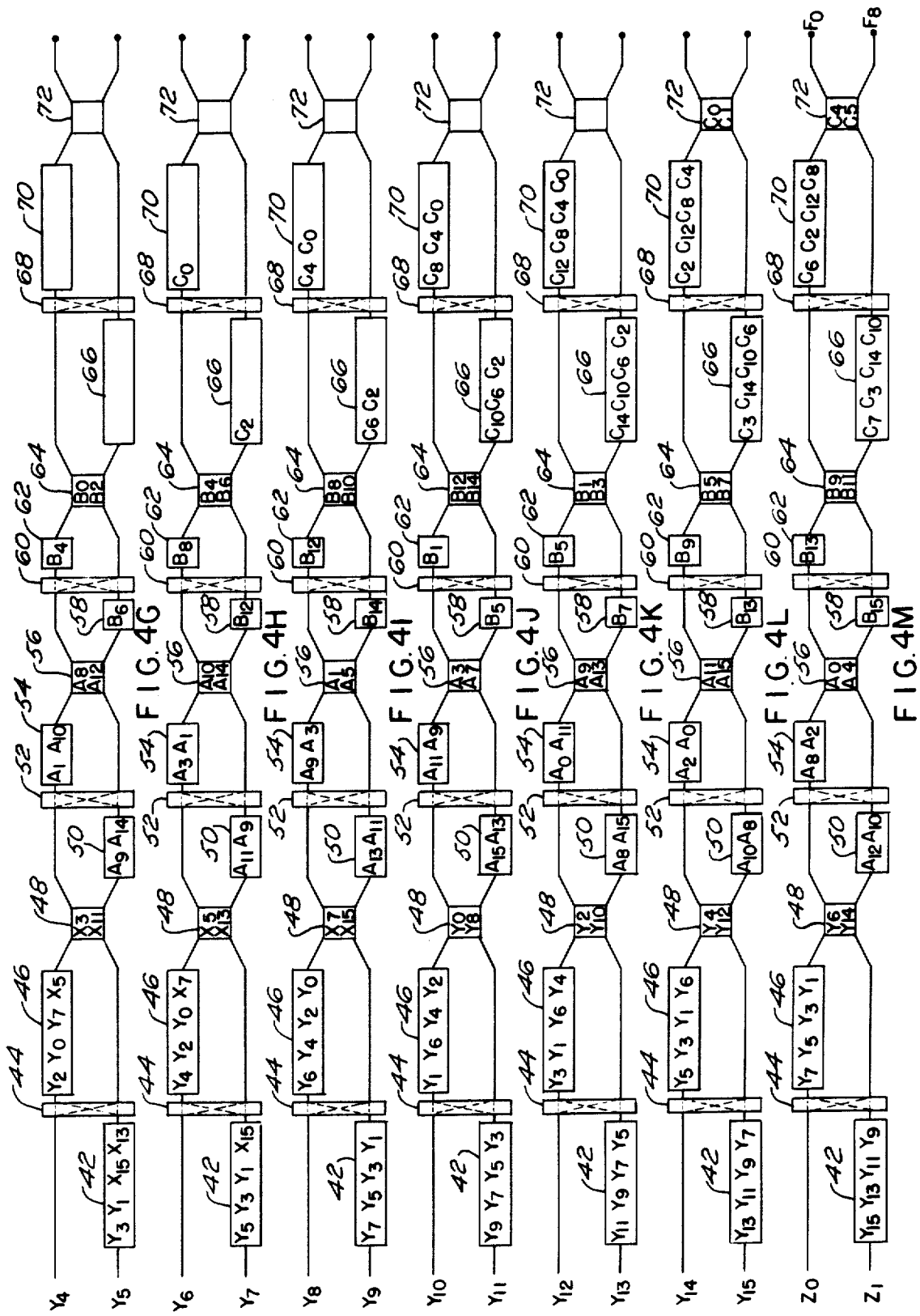

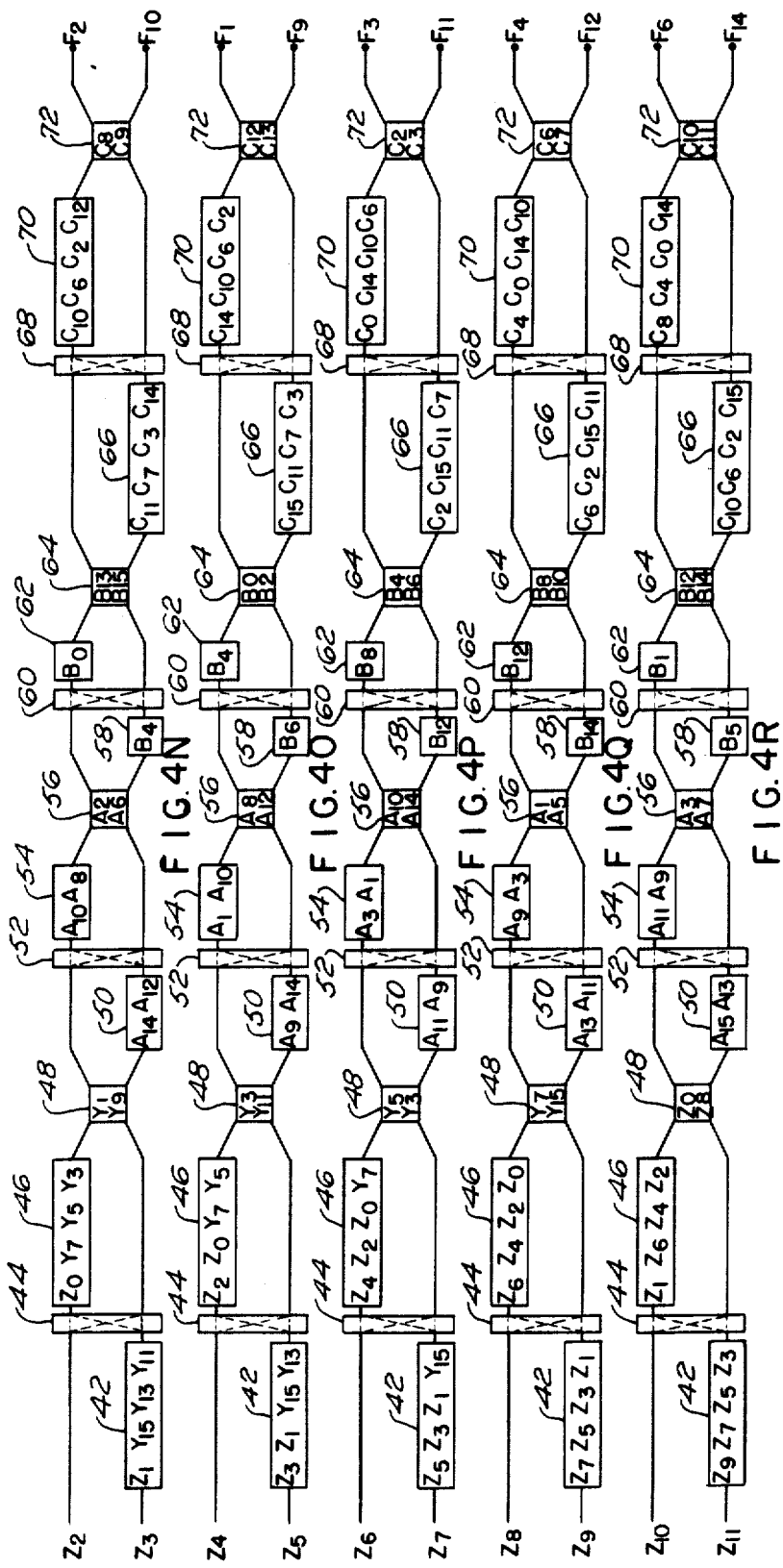

PIPELINED FFT PROCESSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The Fast Fourier Transform (FFT) algorithm is a well known and widely used digital signal processing technique. It produces a set of N output numbers based on an arithmetic manipulation of N input numbers. This disclosure describes a digital processor for computing the FFT algorithm.

(2) Description of the Prior Art

Many FFT processors have been invented based on the different requirements of the applications for which they were intended. They share in common the use of arithmetic units for performing the necessary calculations, memory locations for holding data, and switches for directing data in the proper manner. FFT processors can be expensive, particularly when very high speed operation is desired, the number of inputs N is large, or the word length of the inputs is large. Consequently, neither the arithmetic units nor the memory locations should be wasted or used inefficiently.

Although many FFT processors based on a single arithmetic unit have been described, they are inherently unsuitable for high speed operation. A pipelined FFT processor overcomes this limitation. It employs several arithmetic units in a cascaded configuration. Many processors of this type have been implemented. One such system, as described in the textbook "Theory and Applications of Digital Signal Processing" by L. Rabiner and B. Gold, pages 604 to 606, allows for 50 percent efficiency of the arithmetic units, and requires $2(N-1)-(N/2)$ memory locations. Several other systems requiring only $N-1$ memory locations have also been described, but the arithmetic unit efficiency is still limited to only 50 percent.

One technique for achieving 100 percent arithmetic unit efficiency is to apply two additional buffers of N memory locations each and appropriate switching means to the input of the processor. In this way, a second set of N samples to be transformed can be placed into one memory while a prior set of N samples is being input to the processor from the other. However, this double buffering scheme cannot be used by some processors, nor is it efficient in its use of the memory locations.

Another system processes two channels of N samples each to achieve high arithmetic unit efficiency. Like many other systems, however, its use of the arithmetic units is only 50 percent efficient when processing a single channel of data.

The organization of the arithmetic, storage and switching means of prior art FFT processors imposes a number of restrictions on their use in applications where continuous processing in a highly efficient manner is desired. Many additional distinctions as to the utility of the prior art for use in entirely different applications can also be noted.

SUMMARY OF THE INVENTION

The present FFT processor allows for 100 percent operation of the arithmetic units, while requiring only $2(N-1)-(N/2)$ memory locations. Sequential sets of N inputs are continuously processed in a highly efficient manner. Within a set of N inputs, samples arrive in pairs. This sequence can be derived from a sequential set of inputs through the use of a single time unit delay. Alternately, the processor can be made to operate on sequential streams of N sample sets by internal pipelining of the arithmetic units. Through a novel arrangement of registers and switches, the arithmetic units are continuously provided with the properly sequenced inputs such that they may operate continuously.

BRIEF DESCRIPTION OF THE DRAWINGS

FIG. 3 is a pipelined FFT system for a 16 point transform in accordance with the present invention; and FIGS. 4A through 4R depict the system of FIG. 3 in sequential operation at particular instants in time.

DESCRIPTION OF THE PREFERRED EMBODIMENT

Figure 1:
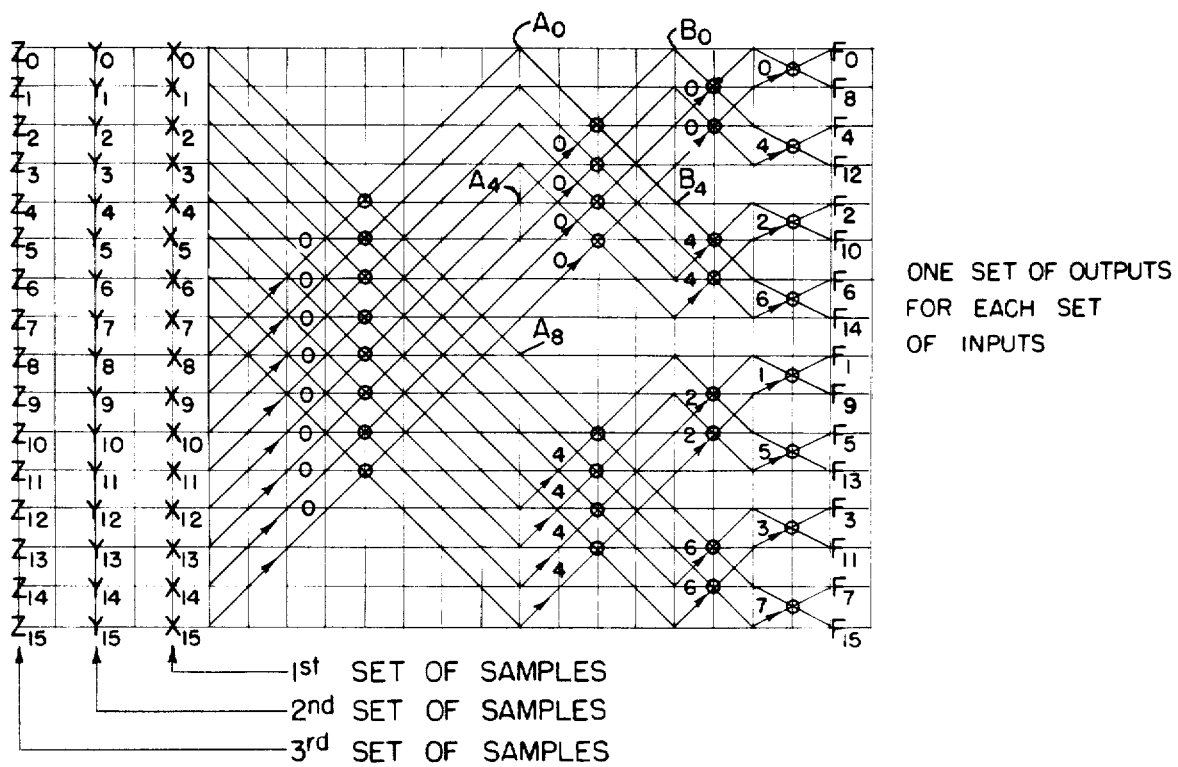
FIG. 1 is a signal flow graph of a 16 point, radix 2, decimation-in-time (DIT) FFT.

FIG. 1 shows the well known signal flow graph of a radix 2, DIT, FFT for the specific case of a 16 point transform. The data samples $X_0$ to $X_{15}$ appear on the left in their natural order, and the transformed outputs $F_0$ to $F_{15}$ appear on the right in bit reversed order in accordance with the FFT algorithm. These numbers are usually expressed in complex number notation. Several intermediate points have been labeled to help clarify the description of subsequent diagrams.

Figure 2:
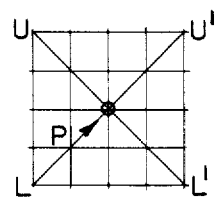
FIG. 2 is a butterfly operation.

The transformation includes a multiple number of butterfly operations. FIG. 2 shows the butterfly operation wherein the calculation $U'=U+LW^p$ and $L'=U-LW^p$, where $W^p$ is a rotation vector. In the labelling convention employed in FIG. 1, the butterfly operation on $X_0$ and $X_8$ produces an $A_0$ and $A_8$, $A_0$ and $A_4$ produces a $B_0$ and $B_4$, etc. The last column of butterflies produces the final results $F_0$ to $F_{15}$. Following the processing of $X_0$ to $X_{15}$, $Y_0$ to $Y_{15}$ and $Z_0$ to $Z_{15}$ are processed in a similar manner. The digits 0 to 7 used in FIG. 1 refer to the letter p in the butterfly operation described in FIG. 2. This notation is used extensively in the art. A decimation-in-frequency (DIF) version of the FFT is also possible in which the multiplication is performed subsequent to the addition and subtraction. Arithmetic units suitable for use in the invention described herein are well known in the art and can be found in the textbook "Theory and Applications of Digital Signal Processing" by L. Rabiner and B. Gold, or in various U.S. and foreign patents such as U.S. Pat. No. 4,275,452 by Stanley A. White.

In a system which performs the calculation described by FIGS. 1 and 2, it is desirable to maximize the arithmetic efficiency while minimizing the storage requirements. The system shown in FIG. 3 is the embodiment of the present invention that attempts this implementation. The notation of FIG. 3 is similar to that found in the previously cited textbook. The flow of data is from left to right.

Shift registers 42, 46, 50, 54, 58, 62, 66 and 70 are used for storing inputs and intermediate results. The length of each shift register is given by the superscript within the shift register block in the figures. Switches 44, 52, 60 and 68 direct data in either of two ways: (1) top left to top right and bottom left to bottom right; (2) top left to bottom right and bottom left to top right. Arithmetic units 48, 56, 64 and 72 perform the butterfly operation.

FIGS. 4A through 4R depict the sequential operation of system 40 shown in FIG. 3 at several instants of time. In FIG. 4A the first two shift registers 42 and 46 are shown loaded with samples $X_0$ to $X_7$. When loading $X_0$ to $X_7$ into registers 42 and 46, the first switch 44 was in the straight through position. This enabled the simultaneous loading of $X_0$ into register 46 and $X_1$ in register 42. This was followed by the simultaneous loading of $X_2$ into register 46 and $X_3$ into register 42, etc. When $X_8$ and $X_9$ appear at the input, the switch 44 assumes the crossover position. This permits $X_8$ to go directly to arithmetic unit 48 while $X_9$ goes to register 42, sending $X_1$ through switch 44 to register 46 and sending $X_0$ to arithmetic unit 48. $X_{10}$ and $X_{11}$ then appear at the input. This is shown in FIG. 4B.

FIG. 4C shows the second stage of the pipeline being used. Following the butterfly operation at arithmetic unit 48, the results $A_0$ and $A_8$ appear in registers 54 and 50, respectively; $A_0$ having been sent through switch 52, which was in the straight through position. The other X inputs in the first stage of the pipeline proceed in the manner previously described. For the specific example being used here, registers 50 and 54 have only two storage locations each. When they are filled, as shown in FIG. 4D, switch 52 assumes the crossover position and registers 50 and 54 supply A signals to arithmetic unit 56 as shown in FIG. 4E.

The butterfly operation of arithmetic unit 56 results in a B signal which goes to registers 58 and 62, each of which has only one storage location. Switch 60 operates in the straight through position until registers 58 and 62 are filled and then switches to the crossover position. Arithmetic unit 64, registers 66 and 70 with four storage locations each, switch 68 between registers 66 and 70, and arithmetic unit 72 complete the components in the description. These operate in a similar manner as the preceding components, and the operation of the components are shown through FIG. 4R. Succeeding sets of N data samples labelled Y and Z are processed in the same manner as was sample set X. The process continues indefinitely so long as inputs are available.

As can be seen in FIGS. 4A through 4R, the processor performs the FFT calculation on a continuous sequence of inputs. Unlike the prior art, it does so with 100 percent arithmetic unit efficiency while requiring only $2(N-1)-(N/2)$ storage locations. In contrast to the double buffering techniques, the maximum speed at which the storage locations must accept inputs or intermediate results is one-half the rate at which new samples are input.

For the purposes of illustration, a 16 point transform has been presumed. Higher or lower point transform processors may be easily constructed from the example shown. Clearly, the odd and even sample lines could just as easily be reversed to accommodate the specific requirements of the algorithm or implementation. If an eight point transform is used, the outputs will not be in scrambled order as in other systems. The shift registers could also be placed on the same sides of the pipeline, as opposed to the criss-cross arrangement shown in the figures. These registers may also consist of random access memories, or any other suitable means by which data can be delayed.

It will be understood that many additional changes in the details, materials, steps and arrangement of parts, which have been herein described and illustrated in order to explain the nature of the invention, may be made by those skilled in the art within the principal and scope of the invention as expressed in the appended claims.

What is claimed is:

1. A system of calculating the Fast Fourier Transform of data comprising:

a plurality of serially connected subsystems with each subsystem including a subsystem first and second input terminal, a switch having first and second input terminals and first and second output terminals with said switch first input terminal connected directly to said subsystem first input terminal, a first delay having an input and output terminal with said first delay input terminal connected directly to said subsystem second input terminal and said first delay output terminal connected directly to said switch second input terminal, a second delay having an input and output terminal with said second delay input terminal connected directly to said switch first output terminal, and an arithmetic element having a first and second input terminal and a first and second output terminal with said arithmetic element first input terminal connected directly to said second delay output terminal and said arithmetic second input terminal connected directly to said switch second output terminal;

the first serially connected subsystem and the last serially connected subsystem have the same number of locations in their respective first and second delays; and each succeeding serially connected subsystem has half the number of locations in their respective first and second delays until the first and second delay each have a predetermined number of locations, then the following subsystem has a first and second delay with the same number of locations as the respective first and second delays of the first serially connected subsystem.

2. A system according to claim 1 wherein said switch has a first and second position wherein said first position has said switch first input terminal connected to one of said switch output terminals and said switch second input terminal connected to the other of said switch output terminals, and said second position has said switch first input terminal connected to the other of said switch output terminals and said switch second input terminal connected to one of said switch first output terminals.

3. A system according to claim 2 wherein said first delay of each subsystem has the same number of locations as said second delay of the same subsystem.

4. A system according to claim 3 wherein said first and second delays comprise first and second shift registers and said switch comprises a crossover switch.

5. A system according to claim 1 wherein said predetermined number of locations is one.

6. A system of calculating the Fast Fourier Transform of data comprising:

a plurality of serially connected subsystems with each subsystem including a subsystem first and second input terminal, a switch having first and second input terminals and first and second output terminals with said switch first input terminal connected directly to said subsystem first input terminal, a first delay having an input and output terminal with said first delay input terminal connected directly to said subsystem second input terminal and said first delay output terminal connected directly to said switch second input terminal, a second delay having an input and output terminal with said second delay input terminal connected directly to said switch first output terminal, and an arithmetic element having a first and second input terminal and a first and second output terminal with said arithmetic element first input terminal connected directly to said second delay output terminal and said arithmetic second input terminal connected directly to said switch second output terminal; and the first serially connected subsystem and the last serially connected subsystem have the same number of locations in their respective first and second delays.

7. A system according to claim 6 wherein said switch has a first and second position wherein said first position has said switch first input terminal connected to one of said switch output terminals and said switch second input terminal connected to the other of said switch output terminals, and said second position has said switch first input terminal connected to the other of said switch output terminals and said switch second input terminal connected to the one of said switch first output terminals.

8. A system according to claim 7 wherein said first delay of each subsystem has the same number of locations as said second delay of the same subsystem.

9. A system according to claim 8 wherein said first and second delays comprise first and second shift registers and said switch comprises a crossover switch.

* * * * *